US012546749B2

United States Patent
Phipps et al.

(10) Patent No.: US 12,546,749 B2
(45) Date of Patent: Feb. 10, 2026

(54) PIG FOR INSPECTING A TUBULAR OBJECT (71) Applicant: Cokebusters Ltd, Chester (GB)

(72) Inventors: Jonathan Phipps, Parkgate (GB); Joseph Walsh, Conwy (GB); Hugh Lewis, Oxfordshire (GB); Nicholas Bettley, Northwich (GB)

(73) Assignee: Cokebusters Ltd, Chester (GB)

( * ) Notice: Subject to any disclaimer, the term of this patent is extended or adjusted under 35 U.S.C. 154(b) by 478 days.

(21) Appl. No.: 18/082,193

(22) Filed: Dec. 15, 2022

(65) Prior Publication Data

US 2023/0194480 A1 Jun. 22, 2023

(30) Foreign Application Priority Data

Dec. 21, 2021 (GB) ..................................... 2118614

(51) Int. Cl.
*G01N 29/24* (2006.01)
*G01N 29/04* (2006.01)
(Continued)

(52) U.S. Cl.
CPC ....... *G01N 29/2481* (2013.01); *G01N 29/043* (2013.01); *G01N 29/226* (2013.01);
(Continued)

(58) Field of Classification Search
CPC ............. G01N 29/2481; G01N 29/043; G01N 29/225; G01N 29/226; G01N 29/265;
(Continued)

(56) References Cited

U.S. PATENT DOCUMENTS 3,539,915 A * 11/1970 Wood ................... G01N 27/904
324/220
3,949,292 A * 4/1976 Beaver ................... G01N 27/82
324/262
(Continued)

FOREIGN PATENT DOCUMENTS

CA 3005840 11/2019
EP 3671204 6/2020
(Continued)

OTHER PUBLICATIONS

Intellectual Property Office, Search Report under Section 17 issued in International Application No. GB2118614.3, May 23, 2022, 2 pp.
(Continued)

*Primary Examiner* — Alexander A Mercado
(74) *Attorney, Agent, or Firm* — Fitch, Even, Tabin & Flannery LLP (57) ABSTRACT

There is provided an untethered, single-bodied pig for inspecting a tubular object. The pig comprises:
a plurality of transducer casings, each transducer casing including an electrical terminal;
a plurality of transducers for detecting a condition of the tubular object, each transducer mounted on or in a respective one of the plurality of transducer casings;
a transducer body defining a plurality of receptacles, each transducer casing removably received in a respective one of the plurality of receptacles; and
a plurality of compressible electrical connectors, each compressible electrical connector at least partially arranged inside a respective one of the plurality of receptacles, wherein each compressible electrical connector is configured to be in electrical contact with the electrical terminal of the transducer casing received in the corresponding receptacle.

18 Claims, 6 Drawing Sheets

(51) Int. Cl.
    *G01N 29/22*     (2006.01)
    *G01N 29/265*     (2006.01)

(52) U.S. Cl.
    CPC ..... *G01N 29/265* (2013.01); *G01N 2291/106* (2013.01); *G01N 2291/2636* (2013.01)

(58) Field of Classification Search
    CPC ...... G01N 2291/106; G01N 2291/2636; B08B 9/0557; F16L 55/26; F16L 55/40; F16L 2101/30; G01M 3/005; G01M 3/246
    See application file for complete search history.

(56) References Cited

U.S. PATENT DOCUMENTS

| | | | | |
|---|---|---|---|---|
| 3,967,194 | A * | 6/1976 | Beaver | G01N 27/82 346/33 P |
| 2005/0126316 | A1* | 6/2005 | Richter | G01N 29/043 73/866.5 |
| 2009/0158850 | A1* | 6/2009 | Alleyne | G01N 29/225 73/623 |
| 2014/0260591 | A1* | 9/2014 | Rodgers | E21B 43/1195 73/152.58 |
| 2014/0340098 | A1 | 11/2014 | Gogol, Jr. | |
| 2019/0086367 | A1* | 3/2019 | Anisimov | G01N 29/225 |
| 2020/0049302 | A1* | 2/2020 | Paulson | G01N 27/87 |
| 2021/0372970 | A1* | 12/2021 | Kwan | G01N 29/265 |
| 2024/0209975 | A1* | 6/2024 | Dos Santos | F16L 55/40 |

FOREIGN PATENT DOCUMENTS

| | | |
|---|---|---|
| GB | 2501312 | 10/2013 |
| GB | 2579865 | 7/2020 |

OTHER PUBLICATIONS

European Patent Office, Extended Search Report issued in International Appliction 22275155.4, Mar. 6, 2023, 5 pp.

* cited by examiner

PIG FOR INSPECTING A TUBULAR OBJECT

CROSS-REFERENCE TO RELATED APPLICATIONS

This application claims priority from United Kingdom patent application No. 2118614.3, filed Dec. 21, 2022, which is hereby incorporated by reference herein in its entirety.

This invention relates to an untethered, single-bodied pig for inspecting a tubular object. Such tubular objects may come in a variety of shapes, such as straight, bent, serpentine and meandering.

Tubing systems in refining furnaces, boilers, fired heaters and other fixed industrial processing apparatuses typically have a sinusoidal path to optimise the exposure of the contents of the tubing systems to heat. Such a sinusoidal path is frequently referred to as being serpentine. Other connecting pipelines, which may be above ground, below ground or under water, can be treated in a similar way for both cleaning and testing using controlled pigs. In a typical tubing system, a product to be treated usually passes through the tubing system that has horizontally and/or vertically set tubes, and the passage of the product through the tubing system may be in a horizontal direction, a downward direction, an upward direction, or a combination thereof. Some tubing systems may include a section of closely packed tubes that may be used to, for example, raise a temperature of the product to be treated by way of convection heating. The pre-heated product may then be passed to a subsequent section of the tubing system in which there is more space between the tubes, and such tubes may be heated by way of radiant heating. Typically, in both sections, the tubing system includes straight tube sections joined by bent tube sections, which may be semi-circular (also known as U-bends) or may be box headers with sharp bends in the form of 90 degree turns, sometimes referred to as "horseshoes" and/or "mule ears". Other tubing systems may include at least one helical coiled tube or at least one arbour coiled tube.

The term "pig" is used to refer to devices that are passed through a pipe or tubing whether for cleaning purposes or for monitoring the condition of the pipe or tubing. Pigs may be used for aiding separation of product from the pipe or tubing, in particular identifying material build-up on interior walls of the pipe or tubing, for fluid transport separation, etc.

Pigs may be used to inspect, detect and record conditions of a pipe or tubing from the inside to check the surface conditions of the interior and/or exterior of the pipe or tubing, to check for material deposits on the interior and/or exterior walls of the pipe or tubing and to check for degradation and irregularities in the pipe or tubing. This is important because, if a pipe or tubing is blocked, breached or has a compromised structural integrity during its operation, it could not only lead to costly and disruptive unscheduled downtime but also result in life threatening conditions for nearby people. In addition it is known to wrap or encase pipelines in insulation material. Carrying out inspection of such pipelines from the inside may avoid costly time and effort in removing the insulation material for the purpose of exposing the pipeline's outer surface.

In order for efficient and safe operation of a tubing system, it is important that the tubing system is not only periodically cleaned and free from deposits, but also inspected to ensure the walls of the tubing system are free from undesirable deposits, tube material condition anomalies, wall thinning and/or various forms of metallurgical degradation. Inspection of a pipe or tubing may be performed to assess the need for cleaning and/or repair or to assess the effectiveness of previous cleaning and/or repair.

Conventionally inspections of a pipe or tubing have been performed online through viewing windows and/or by inspecting the pipe manually during shutdown of the pipe or tubing. Monitoring of the condition of a pipe or tubing has also been conventionally carried out by radiography, precision monitoring of flow and pressure, thermal imaging, and hand-held non-destructive testing (NDT) such as ultrasonic testing (UT). However, each of these techniques is limited in its usefulness and has its disadvantages. Manual NDT can be time consuming, for example taking 6-7 days fully to inspect an entire furnace, and also requires abrasive cleaning of the outer wall of the tubing system of the furnace in order to enable successful inspection. Furthermore, a furnace would normally need internal scaffolding to enable the inspection to be carried out, thus costing considerable time. Thermal imaging usually involves searching for hotspots as an indication of contamination, but is not suitable for inspecting closely packed tubes such as seen in convection heating sections. When monitoring is carried out whilst the furnace is in operation, some areas of the tubing system may not be visible through the viewing windows. Furthermore, the far side of the tubing system is either difficult or impossible to monitor using the conventional monitoring techniques. Accordingly it may be necessary to replace one or more sections of the tubing system according to a supplier-provided lifetime warranty, which can result in not only unnecessary replacement of tube sections but also unnecessary and costly downtime of the tubing system. In subsea situations and where accessibility is prevented by normal means, use of controlled pigging can present a unique option for cleaning and material inspection. Alternatives, such as use of skilled/qualified divers or submersible remote operated equipment, can introduce additional dangers and restrictive or prohibitively high costs.

It is known to provide a tethered pig with monitoring equipment and to send it through a pipe. Operation of the equipment is controlled from outside the pipe via a cable. Responses detected by the on-board monitoring equipment are transmitted back along the cable to an external monitoring unit.

According to an aspect of the invention, there is provided an untethered, single-bodied pig for inspecting a tubular object, the pig comprising:
  a plurality of transducer casings, each transducer casing including an electrical terminal;
  a plurality of transducers for detecting a condition of the tubular object, each transducer mounted on or in a respective one of the plurality of transducer casings;
  a transducer body defining a plurality of receptacles, each transducer casing removably received in a respective one of the plurality of receptacles; and
  a plurality of compressible electrical connectors, each compressible electrical connector at least partially arranged inside a respective one of the plurality of receptacles, wherein each compressible electrical connector is configured to be in electrical contact with the electrical terminal of the transducer casing received in the corresponding receptacle.

In use, the plurality of transducers are used to detect the condition of the tubular object. The condition of the tubular object may include, but is not limited to, a size of a bore of the tubular object, a thickness of a wall of the tubular object, a fault in a wall of the tubular object, and a thickness of material build-up on a wall of the tubular object. As the pig travels along the interior of the tubular object, the plurality of transducers can be utilised to detect the condition of the tubular object along the direction of travel of the pig along the interior of the tubular object. The plurality of transducers in combination with the travel of the pig therefore enables the pig to provide a wide inspection coverage of the tubular object.

The untethered, single body configuration of the pig not only allows all of its components to be mounted on or encapsulated within a single body to enable more accurate inspection of a wider range of tubes of varying diameters and pathways but also allows the direction of travel of the pig to be readily reversed. The single body of the pig is preferably cylindrical or substantially cylindrical. The single body is also preferably symmetrical or substantially symmetrical. The single body may be provided with a nose section at both ends of the single-bodied pig. One or both ends of the single-bodied pig may be shaped to include data connectors such as a USB connector. The single body may be fabricated from several components. For example, in a preferred configuration, the single body may comprise the transducer body sealingly arranged between two end caps, which may define the nose sections at the ends of the single-bodied pig. The seal prevents fluid from entering the interior of the pig. Electronic components and a power supply may be contained within bores of one or two end sections of the transducer body.

Mounting each transducer in or on a respective transducer casing advantageously not only protects the transducers in use but also allows easy installation of each transducer in the transducer body and easy removal of each transducer from the transducer body for maintenance, repair or replacement purposes. Furthermore, such mounting of the transducers in the respective transducer casings enables their arrangement in a fixed pitch circle diameter to allow a geometric centre of the tubular object to be calculated accurately if the pig is misaligned inside the tubular object.

When it comes to inspection of narrow tubular objects, the pig is required to have a suitably sized body to travel through the tubular object while taking into account: the need for space between the pig and the tubular object's walls to provide an optimum travel path of the pig through a fluid in the tubular object; and space constraints when navigating through bends and corners. However, reducing the size of the pig by reducing the size or number of transducers would negatively affect the amount and quality of measurement data that can be obtained by the pig. Moreover, reducing the size of the pig by reducing the size of the transducers and the electrical connections in the transducer body would not only increase the fragility of the pig but also reduce the reliability of the electrical connections and reduce the transducer performance of the transducer casing due to insufficient signal damping from backing material. As a result, straightforward miniaturization of conventional pigs has its disadvantages.

To address the problems faced in reducing the size of the pig, the inventors have created the invention that provides a new way of installing the transducers in the transducer body of the pig. The configuration of the plurality of receptacles and the plurality of compressible electrical connectors in accordance with the invention provides space-saving and reliable electrical connections between the transducers and the transducer body's internal electronics. This in turn allows a reduction in the size of the pig to fit into narrower tubular objects without requiring reductions in the size and number of transducers, which permits the reduced-size pig to use the same transducers as the ones used in larger pigs and thereby avoids the need to sacrifice transducer performance to accommodate miniaturisation of the pig. This is particularly beneficial due to the configuration of the pig as a single-bodied pig.

Furthermore, the provision of the plurality of compressible electrical connectors at least partially arranged inside the respective receptacles eliminates the risk of electrical connection misalignment during installation of the transducers that bring the electrical terminals into contact with the respective compressible electrical connectors. In contrast, any attempt to try and reduce the size of conventional pigs results in an increased risk of electrical connection misalignment during installation of a transducer, which may damage or break the transducer or an electrical connector.

The following features of the invention improve the robustness of the electrical connections so as to be not adversely affected by reducing the size of the pig.

In embodiments of the invention, each compressible electrical connector may be a resiliently biased electrical connector. This improves the electrical contact between each compressible electrical connector and the corresponding electrical terminal to ensure reliable operation of the pig while allowing for easy disconnection and reconnection between each compressible electrical connector and the corresponding electrical terminal. This in turn facilitates installation or replacement of the transducers without damaging or breaking the corresponding electrical terminal or compressible electrical connector.

In such embodiments of the invention, each compressible electrical connector may be a spring-loaded electrical connector. This provides a mechanically effective way of providing a resiliently biased electrical connector having the above-mentioned benefits.

In further embodiments of the invention, each compressible electrical connector may be configured to protrude into the corresponding receptacle. Each compressible electrical connector protruding into the corresponding receptacle advantageously results in an effective electrical connection being formed by simply inserting a transducer casing into the corresponding receptacle.

In such embodiments of the invention, each compressible electrical connector may be configured to protrude through a base of the corresponding receptacle. The compressible electrical connector being configured to protrude through a base of the corresponding receptacle improves the reliability of the pig by reducing the risk of the compressible electrical connector snapping and preventing potentially damaging rotational forces from being applied to components (e.g. soldered joints on a printed circuit board) inside the pig as each transducer casing is inserted into the corresponding receptacle.

In still further embodiments of the invention, each transducer casing may be threadably received within the corresponding receptacle. This not only ensures a correct and secure positioning of each transducer casing in the respective receptacle but also allows for a controlled insertion of the transducers into the respective receptacles to avoid damaging the transducer body or the compressible electrical connectors by applying too much force.

In embodiments of the invention, each transducer casing may include an abutment member, and each abutment member may be configured to abut the transducer body outside the corresponding receptacle when the corresponding transducer casing is received within the corresponding receptacle. The presence of an abutment member advantageously ensures a correct positioning of each transducer casing in the respective receptacle by limiting the extent to which each transducer casing may be inserted in the respective receptacle, and thereby reduces the risk of damaging the corresponding compressible electrical connector through excessive compression.

In such embodiments of the invention, the abutment member may be a flange. This not only provides a simple and effective way to restrict excessive compression on a corresponding compressible electrical connector but also provides a fixed and sturdy abutment member that ensures consistency in the relative positions of the transducers even after repeated use, removal and replacement.

In further embodiments of the invention, each transducer casing may be tapered (e.g. chamfered, bevelled) at its inwardly facing end that is located inside the receptacle. This prevents contact with neighbouring components, including neighbouring transducer casings, which provides space savings and thereby allowing for further reductions in the size of the pig to fit into narrow tubular objects, while providing a sufficiently sized transducer casing to maintain a signal damping performance of the transducer casing.

In still further embodiments of the invention, the plurality of receptacles may be arranged around a cross-sectional perimeter of the transducer body. Since the plurality of receptacles and therefore the plurality of transducers being arranged around a cross-sectional perimeter of the transducer body allows for improved inspection coverage of the tubular object, the invention advantageously enables a compact configuration of such a transducer arrangement in a pig of reduced size in order to maintain high levels of inspection coverage.

In embodiments of the invention, the plurality of receptacles may be arranged to be staggered around the cross-sectional perimeter of the transducer body. The plurality of receptacles and therefore the plurality of transducers being arranged to be staggered around the cross-sectional perimeter of the transducer body reduces the required cross-sectional size of the transducer body while preventing contact between neighbouring transducer casings and between opposite transducer casings, which provides further space savings and thereby allowing for further reductions in the size of the pig to fit into narrow tubular objects.

In further embodiments of the invention, each transducer may be, but is not limited to, an ultrasonic transducer. The provision of ultrasonic transducers allows the pig to identify conditions in the tubular object by producing ultrasonic pulse signals and receiving their echoes while being driven and surrounded by a fluid such as water.

In still further embodiments of the invention, the transducer body may be a unitary body. The transducer body can therefore be machined from a single piece of material, avoiding the need for any fasteners in the transducer body which can be difficult to handle in a pig of reduced size.

In embodiments of the invention, the transducer body may be made of a metallic material. The metallic material may be, but is not limited to, a titanium alloy. The pressure of water, or other fluids, in a narrow tubular object will inevitably be greater than that of a larger tubular object due to reduced space. The use of a metallic material for the transducer body allows the pig to withstand such strong pressures after being reduced in size to fit into the narrow tubular object. Moreover, using a titanium alloy advantageously provides further reliability and longevity to the transducer body.

In embodiments of the invention, the pig may further include an insert portion removably inserted in a bore of the transducer body, wherein the insert portion and the transducer body may cooperate to define the plurality of receptacles. The provision of an insert portion simplifies the manufacturing of the transducer body because the insert portion can be manufactured to define the internal structure required to support or house electrical or electronic components. Furthermore, the insert portion can be easily removed from the transducer body for maintenance, repair or replacement purposes, which in turn enables a compact construction of the pig.

In embodiments of the invention, each compressible electrical connector may be mounted on or in the insert portion. The insert portion may be made of a polymer material. Mounting each compressible electrical connector on or in the insert portion not only allows them to be supported and secured relative to the transducer body and the respective transducer casings but also permits easy maintenance, repair or replacement of any damaged or broken compressible electrical connector by removing the insert portion from the transducer body. Furthermore, making the insert portion of a polymer material facilitates the mounting of each compressible electrical connector on or in the insert portion.

In embodiments of the invention, the transducer body may have an intermediate portion that is arranged between two end portions, and the intermediate portion may define the plurality of receptacles. Internal components may be stored inside either or both of the end portions, which distributes the components along the length of the pig rather than being focused in the intermediate portion. This in turn not only allows further reductions in the overall size of the pig but also permits reductions in the size of the intermediate portion to position each transducer at a desired distance from the feature of the tubular object to be inspected or sensed.

In embodiments of the invention, the pig may further include a power supply device stored in a bore of one of the end portions. There is industry demand for inspection of narrow tubular objects with long uninterrupted lengths. It is therefore advantageous for a pig to be capable of completing a full inspection of a long uninterrupted tubular object by relying on an internal power supply device. Moreover, the power supply device being stored in a bore of one of the end portions allows for the pig to have a narrower overall cross-section since the internal components of the pig are distributed along the length of the pig rather than being focused in the intermediate portion.

In embodiments of the invention, the pig may further include a printed circuit board configured to physically separate the power supply device and the compressible electrical connectors, wherein the printed circuit board may be electrically connected to each of the power supply device and the compressible electrical connectors. The compressible electrical connectors may be located in an intermediate portion of the transducer body while the power supply device may be located in an end portion of the transducer body.

In addition to its cross-section, the length of the pig is critical since an excessive length can prevent a pig from navigating around bends or corners of the tubular object. Configuration of the printed circuit board to physically separate the power supply device and the compressible electrical connectors advantageously provides a compact arrangement that allows the pig to be reduced in length without adversely affecting its operation.

In embodiments of the invention, a maximum cross-sectional width (e.g. diameter) of the transducer body may be equal to or smaller than 33 mm. In further embodiments of the invention, a maximum length of the pig may be equal to or smaller than 53 mm. The configuration of the invention enables the reduction in the pig's size to these dimensions so that it is able to travel through a tubular object having an internal diameter of 38.1 mm while carrying out inspection of conditions of the tubular object.

In embodiments of the invention, the ratio of a sensor face diameter of each transducer to the maximum width (e.g. diameter) of the transducer body may be, but is not limited to, in the range of 0.15 to 0.2. Each transducer may have, but is not limited to, a sensor face diameter of at least 6 mm. The configuration of the invention enables the reduction in the pig's size while using sufficiently large sensor face diameters to ensure that the quality and performance of the transducers are not sacrificed. More specifically, each transducer having a sensor face diameter of at least 6 mm provides the pig with desired inspection capabilities.

In embodiments of the invention, a maximum length of each transducer may be equal to or smaller than 10 mm.

It will be appreciated that the use of the terms "first" and "second", and the like, in this patent specification is merely intended to help distinguish between similar features and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

Preferred embodiments of the invention will now be described, by way of non-limiting examples, with reference to the accompanying drawings in which.

The figures are not necessarily to scale, and certain features and certain views of the figures may be shown exaggerated in scale or in schematic form in the interests of clarity and conciseness.

Figure 1:
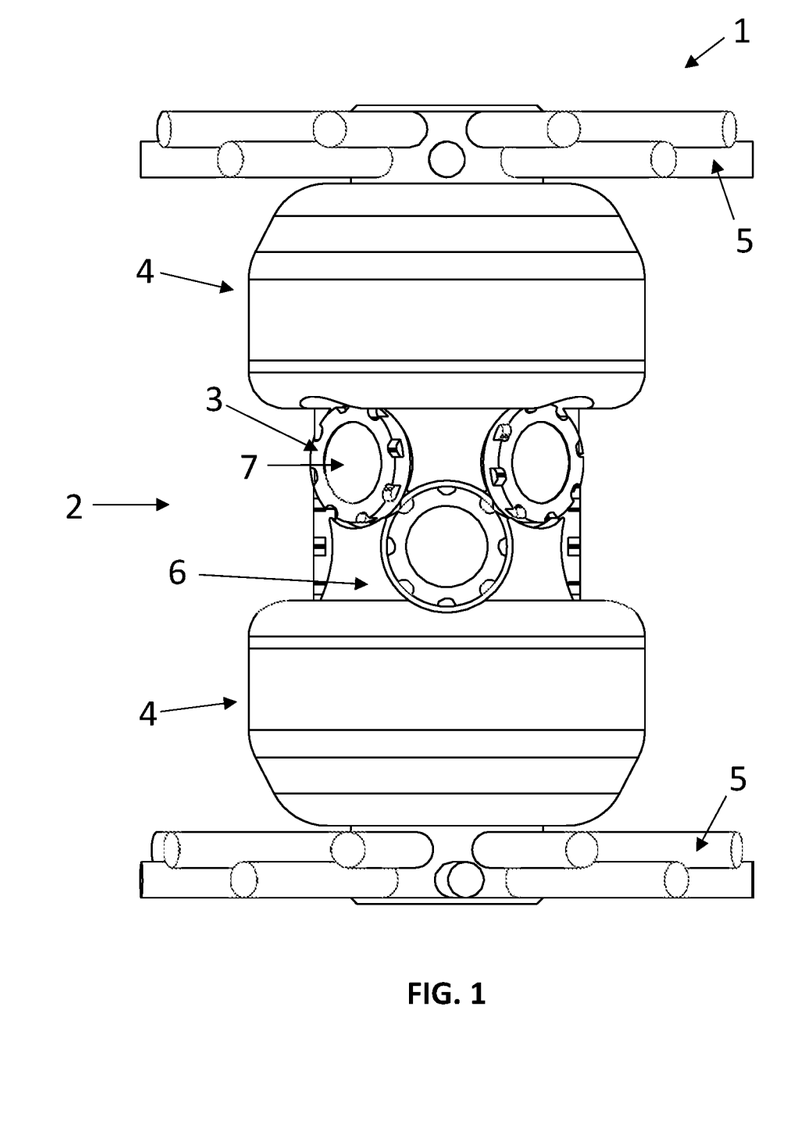
FIG. 1 shows a pig according to an embodiment of the invention.

A pig for inspecting a tubular object is shown in FIG. 1 and is designated generally by the reference numeral 1. The pig 1 comprises a transducer body 6 that is configured to removably receive a plurality of transducer casings 3. The transducer body 6 comprises an intermediate portion 2 arranged between two end portions 4 so that the intermediate portion 2 and the end portions 4 are co-axially aligned along the length of the pig 1. The cross-section of each of the intermediate portion 2 and end portions 4 of the transducer body 6 is substantially circular and vary in diameter along their respective lengths.

Each one of the end portions 4 is covered by a respective end cap on which an alignment implement 5 is mounted. The alignment implements 5 are configured to, in use, engage an interior wall of the tubular object so as to align the pig 1 relative to the tubular object. In the embodiment shown in FIG. 1, each alignment implement 5 comprises a plurality of radially extending resilient brushes. In other embodiments, each alignment implement may comprise a resilient flange.

The transducer body 6 and the end caps together define a single body of the pig 1, i.e. a single-bodied pig.

A transducer is mounted in or on a respective one of the transducer casings 3, each transducer defining a sensor face 7 and each transducer casing 3 being configured to encase and protect the transducer that is mounted therein or thereon.

In the embodiments shown, the plurality of transducers is a plurality of ultrasonic transducers configured to both transmit and receive an ultrasonic signal (or signals). Each transducer includes a piezocomposite crystal, which functions as a transmitter to convert an electrical signal supplied by an electronic component, into a transmitted ultrasonic signal. The transmitted ultrasonic signal is transmitted towards the wall of the tubular object, and is then reflected off an internal or external surface of the wall of the tubular object, or off material build-up on an interior or exterior wall of the tubular object, back towards the piezocomposite crystal. In this way, the piezocomposite crystal is able to receive a first reflected ultrasonic signal from the internal wall surface of the tubular object, and also receive a second reflected ultrasonic signal from the external wall surface of the tubular object. The piezocomposite crystal then functions as a sensor that converts the received (reflected) ultrasonic signal(s) into an electrical signal (or electrical signals) for analysis.

In other embodiments, the plurality of transducers may be a plurality of transducers configured to transmit other types of acoustic signals or electromagnetic radiation signals. For example, each transmitter may be a laser or radio transmitter. It will also be appreciated that, in other embodiments of the invention, each transducer may include a transmitter and receiver that are separate from each other.

In the embodiment shown in FIG. 1, the transducer body 6 is preferably configured to have a maximum cross-sectional diameter equal to or smaller than 33 mm. The cross-sectional diameter of the transducer body 6 is greatest at the points where the intermediate portion 2 and the two end portions 4 are connected. The pig 1 is also configured to have a maximum length equal to or smaller than 53 mm. The pig 1 having these dimensions is capable of travelling through tubular objects (such as tubes and pipelines) having an internal diameter of 38.1 mm with a 1D bend.

The ratio of a sensor face diameter of each transducer to the maximum cross-sectional diameter of the transducer body 6 is preferably in the range of 0.15 to 0.2. Such a dimensional ratio enables the pig 1 to inspect narrow tubular objects without compromising the quality and coverage of the inspection by overly reducing the size of the sensor faces 7 of its transducers. In the embodiment shown in FIG. 1 each transducer preferably has a sensor face diameter of at least 6 mm. The length of each transducer is preferably equal to or smaller than 10 mm. In other embodiments, the dimensions of the pig may be tailored for differently sized tubular objects but the overall arrangement of the pig's components may remain the same.

Figure 2:
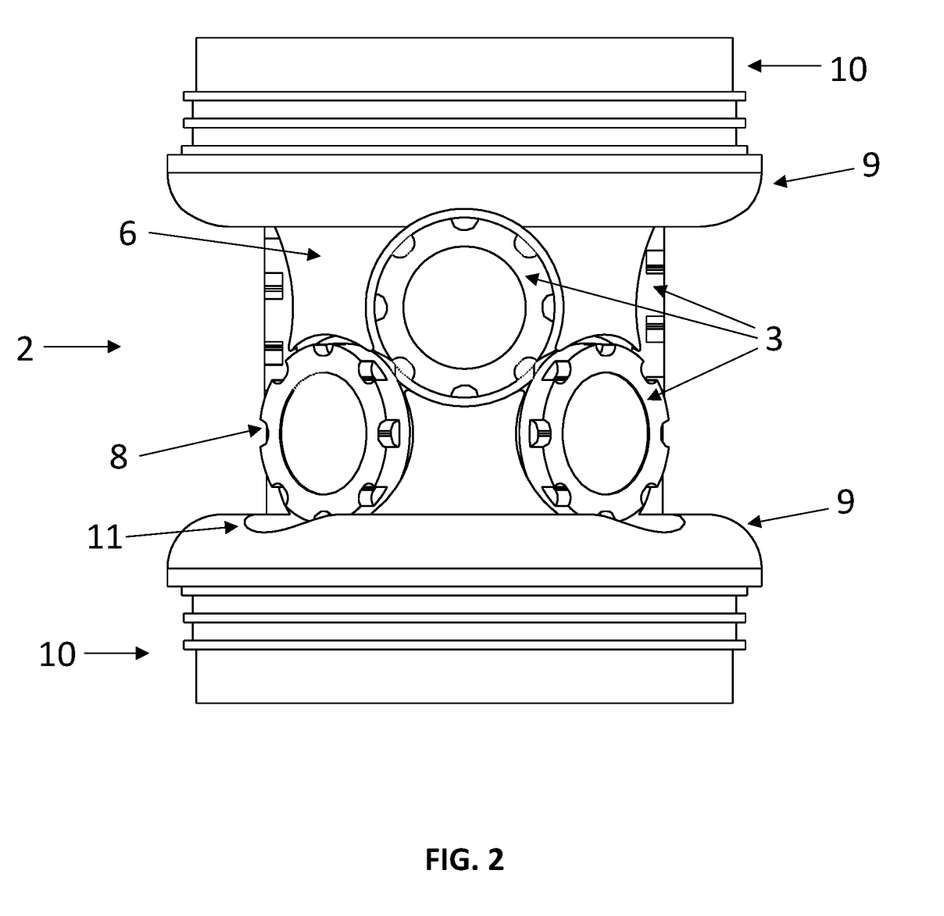
FIG. 2 shows a transducer body of the pig of FIG. 1.

The transducer body 6 is shown in greater detail in FIG. 2. The plurality of transducer casings 3 is staggered around a cross-sectional perimeter of the intermediate portion 2 of the transducer body 6. In the embodiment shown in FIG. 2, the transducer body 6 is configured to receive eight transducer casings 3 that are staggered around the cross-sectional perimeter of the transducer body 6, which permits a higher number of transducer casings 3 to be used in comparison to a non-staggered arrangement of the transducer casings 3 around the cross-sectional perimeter of the transducer body 6. It will be understood that, in other embodiments, the transducer body may be configured to receive any number of transducer casings that enables the pig to detect a condition of the tubular object.

The plurality of transducer casings 3 is made of a metallic material, preferably of stainless steel. In other embodiments, the plurality of transducer casings may be made of other materials such as other metallic materials.

Each transducer casing 3 has a substantially circular contour that surrounds a substantially circular sensor face 7 of the respective transducer. Each transducer casing 3 includes a plurality of gripping elements 8 to facilitate grip and manually rotation of the transducer casing 3, which may be carried out using a tool. As shown in the embodiment of FIG. 2, the gripping elements 8 are semi-circular indentations spaced around the outer circumference of each transducer casing 3 that surrounds the sensor face 7. In other embodiments, the transducer casings may comprise any number of gripping elements, which may be in the form of indentations of other shapes or in the form of protrusions. Alternatively the transducer casings may each have an outer contour that is shaped, e.g. as a hexagon, to improve grip and manually rotation of the transducer casings. Further alternatively, the transducer casings may omit any gripping elements.

The transducer body 6 shown in FIG. 2 defines the intermediate portion 2, around and in which the plurality of transducer casings 3 is received, and each end portion 4 comprising a shoulder 9 and a connecting part 10. The transducer body 6 defines a bore therein along its length, the bore being narrower at the intermediate portion 2 and wider at each of the shoulders 9 and connecting parts 10 forming the respective end portion 4.

The shoulders 9 define the widest part of the transducer body 6 and are adjacent to the intermediate portion 2. The connecting parts 10 are radially recessed with respect to the shoulders 9 and extend away from the intermediate portion 2 along the length of the pig 1. Each connecting part 10 has a substantially circular cross-section and has a threaded outer surface to threadedly engage with an inner threaded surface of the respective end cap. In alternative embodiments, the end caps may be attached to the end portions 4 using other forms of connection, such as fasteners, clips, a press fit or a push fit.

A bore of each end portion 4 combines with a bore of the respective end cap to define an end bore 20,21. Each end bore 20,21 is connected to a respective end of a bore of the intermediate portion 2 so that the end bores 20,21 combine with the bore of the intermediate portion 2 to define an overall bore of the pig 1.

As shown in FIG. 2, the shoulders 9 define grooves 11 spaced along their respective circumferences to allow the plurality of transducer casings 3 to be inserted into the intermediate portion 2. This allows for a more compact arrangement of the transducer body 6.

Figure 3:
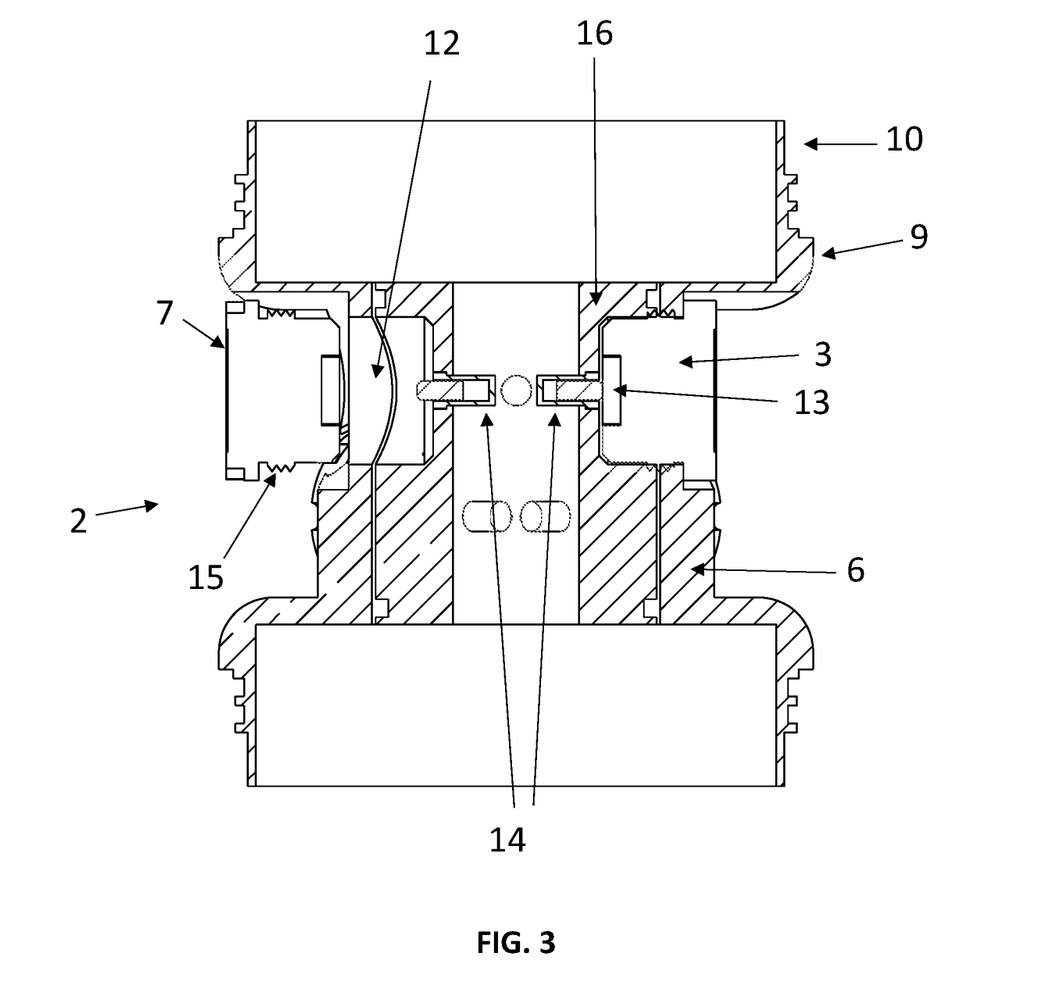
FIG. 3 shows a cross-section of the transducer body of FIG. 2.

FIG. 3 shows a longitudinal cross-section of the transducer body 6 shown in FIG. 2. A transducer casing 3 is shown received inside a receptacle 12 of the transducer body 6 (right hand side of FIG. 3). Another transducer casing 3 is shown removed from another receptacle 12 so as to be outside of the transducer body 6 (left hand side of FIG. 3). O-rings may be used to provide better sealing when the transducer casings 3 are received inside the respective receptacles 12.

Each transducer casing 3 comprises an electrical terminal 13. The electrical terminal 13 and the sensor face 7 are located at opposite ends of the corresponding transducer casing 3 so that, when the corresponding transducer casing 3 is received inside the corresponding receptacle 12, each electrical terminal 13 is located at an inwardly facing end of the corresponding transducer casing 3 that is located inside the corresponding receptacle 12 while the sensor face 7 is located at an outwardly facing end of the corresponding transducer casing 3. Each electrical terminal 13 is configured to be in electrical contact with a respective compressible electrical connector 14 when the corresponding transducer casing 3 is received inside the corresponding receptacle 12. Each electrical terminal 13 defines a flat terminal surface that is flush with a surface of the inwardly facing end of the corresponding transducer casing 3. In alternative embodiments, the electrical terminal may define a convex or concave terminal surface instead of a flat terminal surface.

A screw thread 15 is formed around each transducer casing 3 to allow each transducer casing 3 to be threadedly and removably received inside a corresponding receptacle 12. In other embodiments, each transducer casing 3 may be configured to be removably received inside the corresponding receptacle 12 by way of a press fit (also known as force fit or interference fit) or a push fit.

An insert portion 16 is removably plugged inside the bore of the intermediate portion 2. The transducer body 6 is a unitary body made of a metallic material, preferably a titanium alloy. The transducer body 6 may be machined out of a block of the metallic material. The insert portion 16 is made of a polymer material such as polyether ether ketone (PEEK). The intermediate portion 2 has a plurality of openings staggered around its cross-sectional perimeter and the insert portion 16 has a plurality of recesses staggered around its cross-sectional perimeter. By inserting the insert portion 16 in a bore of the transducer body 6 and by aligning the openings of the intermediate portion 2 and the recesses of the insert portion 15, the transducer body 6 and the insert portion 16 cooperate to define the plurality of receptacles 12 of the transducer body 6, each of which removably receives a respective transducer casing 3, where each receptacle 12 is formed of an opening and a recess. In particular, the recesses of the insert portion 16 form the base and the lower side walls of the plurality of receptacles 12, while the openings of the intermediate portion 2 define the upper side walls of the plurality of receptacles 12. Each receptacle 12 has a substantially circular cross-section but may have other cross-sectional shapes in other embodiments. Each of the lower side walls and upper side walls of the receptacles 12 are threaded (not shown) to threadedly engage the screw thread of the transducer casings 3.

Figure 4:
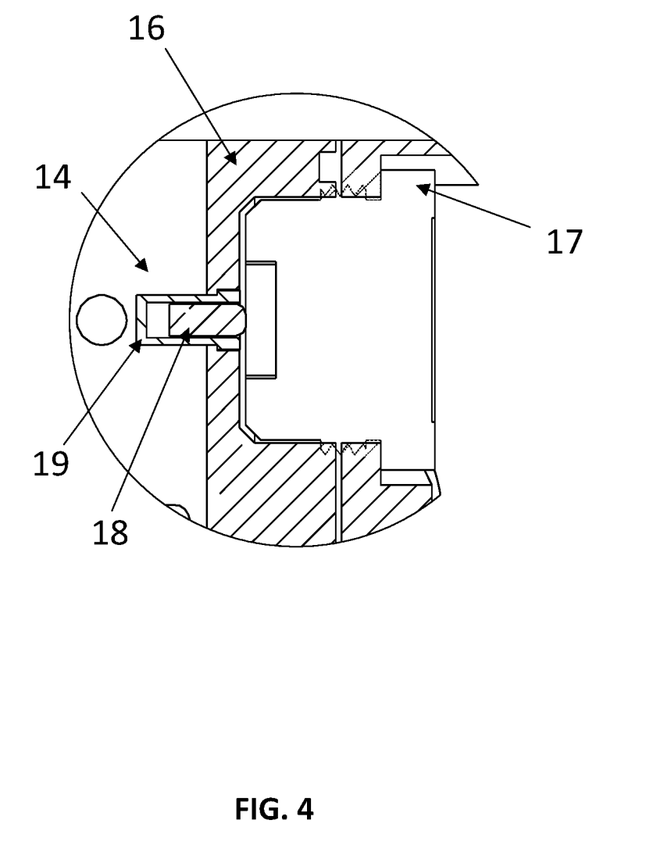
FIG. 4 shows a transducer casing received in a receptacle shown in FIG. 3.

As shown in FIGS. 3 and 4, the insert portion 16 supports the plurality of compressible electrical connectors 14 so each compressible electrical connector 14 protrudes into a respective one of the receptacles 12 through its base. Each compressible electrical connector comprises a pin casing 19, a pin 18 and a spring (not known). The purpose of the spring is to configure the pin 18 as a spring-loaded pin 18 that is biased to move into the receptacle 12. As a transducer casing 3 is inserted into the corresponding receptacle 12, the electrical terminal 13 of the transducer casing 3 comes into electrical contact with the pin 18 to establish electrical connection. Further insertion of the transducer casing 3 into the corresponding receptacle 12 causes the electrical terminal 13 to push against the pin 18. The spring maintains good electrical contact between the electrical terminal 13 and the pin 18.

Each compressible electrical connector 14 is centrally positioned inside the corresponding receptacle 12 while the electrical terminal 13 is centrally positioned at the inwardly facing end of the corresponding transducer casing 3. In other embodiments, the compressible electrical connectors and the electrical terminals may have off-centre positions relative to the receptacles and the transducer casings respectively.

Each transducer casing 3 comprises an abutment member 17 in the form of a flange. As an example, the flanged portion of the transducer casing 3 may have a diameter of 10 mm while the non-flanged portion of the transducer casing 3 may have a diameter of 8 mm. The plurality of gripping elements 8 are arranged around the circumference of the flange 17. When each transducer casing 3 is inserted into the corresponding receptacle 12, the flange 17 eventually abuts the transducer body 6 outside the corresponding receptacle 12 to prevent further insertion. The combination of the screw thread 15 and flange 17 in each transducer casing 3 therefore not only allows controlled insertion of the plurality of transducer casings 3 into the respective receptacles 12 but also limits the insertion of each transducer casing 3 inside the respective receptacle 12, thus ensuring a correct position of each transducer casing 3 inside the respective receptacle 12 and reducing the risk of damage to the compressible electrical connectors 14 due to excessive compression. A pitch of the screw thread 15 may be selected to provide the desired controlled insertion and positioning of each transducer casing 3 inside the respective receptacle 12. In other embodiments, the plurality of transducer casings 3 may comprise an alternative abutment member, such as at least one projection or at least one protrusion, that acts to limit the insertion of the transducer casing 3 inside the respective receptacle 12.

Figure 5:
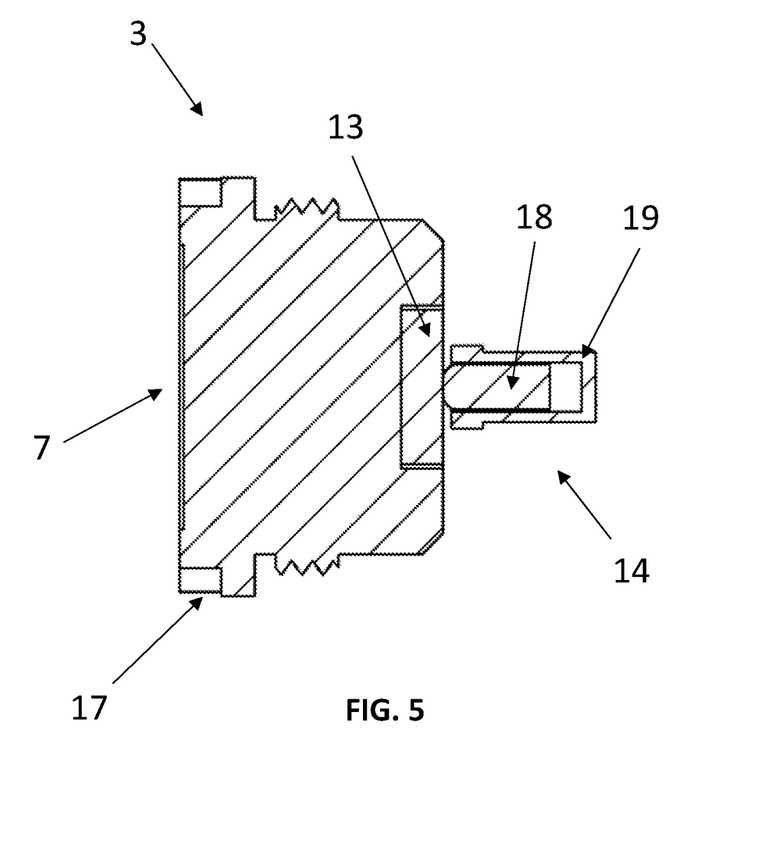
FIG. 5 shows electrical contact between a compressible electrical connector and an electrical terminal of a transducer casing.

Each transducer casing 3 is substantially cylindrical in shape and is additionally tapered at its inwardly facing end. As shown in FIGS. 3, 4 and 5, the transducer casing 3 comprises a chamfered edge around the circumference of its inwardly facing end, which provide space savings to prevent unwanted contact with neighbouring and opposite transducer casings in a compact pig design. In other embodiments, each transducer casing may have a different tapered configuration, such as a conical shape.

Figure 6:
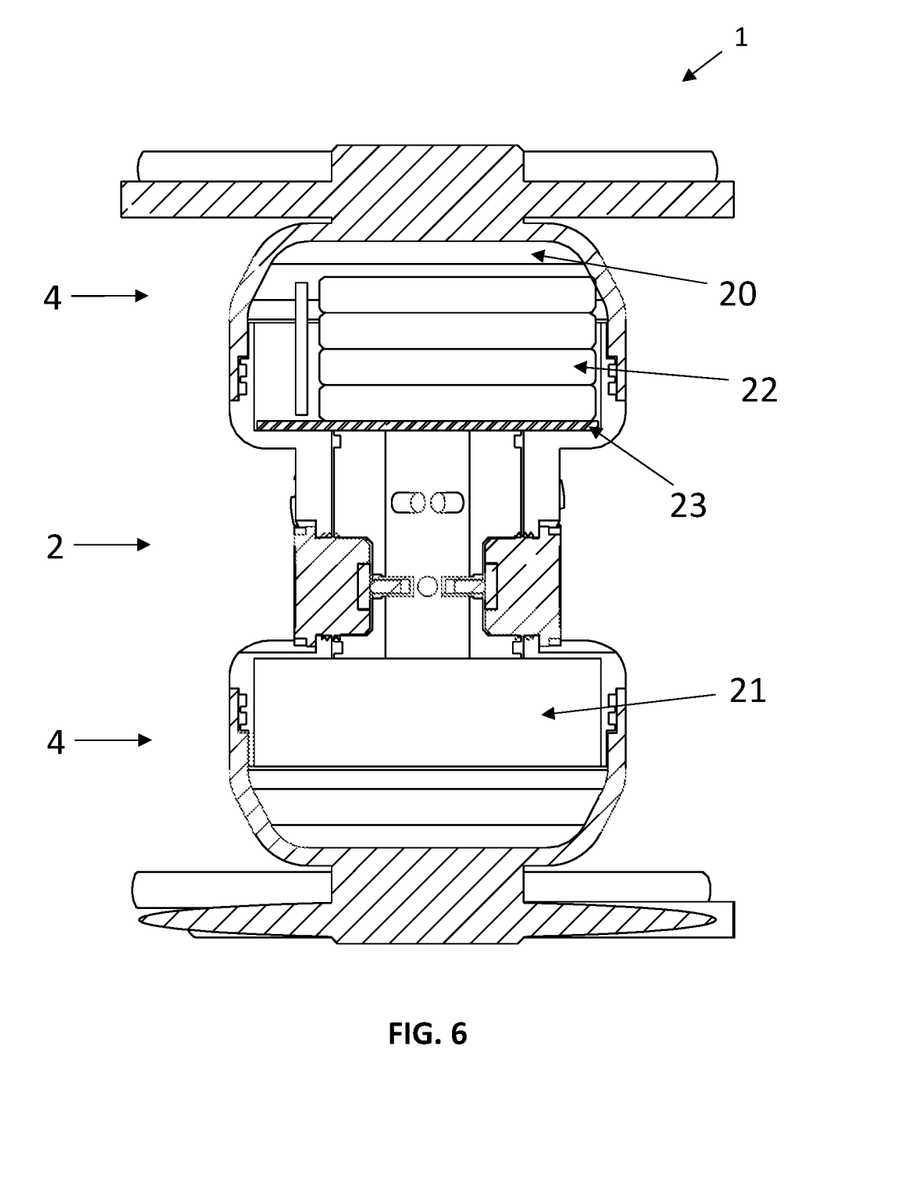
FIG. 6 shows a cross-section of the pig of FIG. 1.

FIG. 6 shows a longitudinal cross-section of the pig 1 of FIG. 1 and shows the threaded engagement of each end portion 4 with the respective end cap.

The pig 1 comprises a power supply device 22 that is received in the first end bore 20. The power supply device 22 is a battery comprising a stack of cells. The plurality of cells preferably comprises 3.8V lithium polymer cells, which may be shrink-wrapped into a battery assembly.

The pig 1 further comprises a printed circuit board 23 arranged perpendicularly with respect to the length of the pig 1 so that the printed circuit board 23 acts as a physical divider between the battery 22 and the insert portion 16. The battery 22 is mounted onto the printed circuit board 23, preferably using a blade connection design, so that the battery 22 is electrically connected to internal electronics inside the pig 1. The printed circuit board 23 is electrically connected to the compressible electrical connectors 14, via suitable electrical connections such as wiring, to enable control electronics (e.g. a processor) on the printed circuit board 23 to receive the information collected by the plurality of transducers. The control electronics on the printed circuit board 23 also manages the power supply from the battery 22.

The pig 1 preferably comprises a storage media device, such as a memory card, configured to store the information collected by the plurality of transducers. The storage media device may be housed in either the first end bore 20 or the second end bore 21.

The foregoing features of the pig 1 enables reduction in the overall size of the pig 1 in order to fit into and travel through narrower tubular objects without adversely affecting the performance of the pig 1.

The listing or discussion of an apparently prior published document or apparently prior published information in this specification should not necessarily be taken as an acknowledgement that the document or information is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. An untethered, single-bodied pig for inspecting a tubular object, the pig comprising:
   a plurality of transducer casings, each transducer casing including an electrical terminal;
   a plurality of transducers for detecting a condition of the tubular object, each transducer mounted on or in a respective one of the plurality of transducer casings;
   a transducer body defining a plurality of receptacles, each transducer casing removably received in a respective one of the plurality of receptacles;
   a plurality of compressible electrical connectors, each compressible electrical connector at least partially arranged inside a respective one of the plurality of receptacles, wherein each compressible electrical connector is configured to be in electrical contact with the electrical terminal of the transducer casing received in the corresponding receptacle,
   wherein the transducer body has an intermediate portion that is arranged between two end portions, and the intermediate portion defines the plurality of receptacles, and
   a power supply device stored in a bore of one of the end portions.

2. The untethered, single-bodied pig according to claim 1 wherein each compressible electrical connector is a resiliently biased electrical connector.

3. The untethered, single-bodied pig according to claim 2 wherein each compressible electrical connector is a spring-loaded electrical connector.

4. The untethered, single-bodied pig according to claim 1 wherein each compressible electrical connector is configured to protrude into the corresponding receptacle.

5. The untethered, single-bodied pig according to claim 1 wherein each transducer casing is threadably received within the corresponding receptacle.

6. The untethered, single-bodied pig according to claim 1 wherein each transducer casing includes an abutment member, and wherein each abutment member is configured to abut the transducer body outside the corresponding receptacle when the corresponding transducer casing is received within the corresponding receptacle.

7. The untethered, single-bodied pig according to claim 1, wherein each transducer casing is tapered at its inwardly facing end that is located inside the receptacle.

8. The untethered, single-bodied pig according to claim 1 wherein the plurality of receptacles is arranged around a cross-sectional perimeter of the transducer body.

9. The untethered, single-bodied pig according to claim 1 wherein each transducer is an ultrasonic transducer.

10. The untethered, single-bodied pig according to claim 1 wherein the transducer body is a unitary body.

11. The untethered, single-bodied pig according to claim 1 wherein the transducer body is made of a metallic material.

12. The untethered, single-bodied pig according to claim 1 further including an insert portion removably inserted in a bore of the transducer body, wherein the insert portion and the transducer body cooperate to define the plurality of receptacles.

13. The untethered, single-bodied pig according to claim 12 wherein each compressible electrical connector is mounted on or in the insert portion.

14. The untethered, single-bodied pig according to claim 12 wherein the insert portion is made of a polymer material.

15. The untethered, single-bodied pig according to claim 1 including a printed circuit board configured to physically separate the power supply device and the compressible electrical connectors, wherein the printed circuit board is electrically connected to each of the power supply device and the compressible electrical connectors.

16. The untethered, single-bodied pig according to claim 1 wherein a maximum cross-sectional width of the transducer body is equal to or smaller than 33 mm.

17. The untethered, single-bodied pig according to claim 1 wherein a maximum length of the pig is equal to or smaller than 53 mm.

18. The untethered, single-bodied pig according to claim 1, wherein the ratio of a sensor face diameter of each transducer to the maximum cross-sectional width of the transducer body is in the range of 0.15 to 0.2.

* * * * *